FIG.1

Dec. 16, 1952  R. M. M. OBERMAN ET AL  2,622,141
SIGNALING SYSTEM

Filed Oct. 27, 1949  5 Sheets-Sheet 2

Patented Dec. 16, 1952

2,622,141

UNITED STATES PATENT OFFICE 2,622,141

SIGNALING SYSTEM

Roelof Maarten Marie Oberman and Antonie Snijders, The Hague, Netherlands

Application October 27, 1949, Serial No. 123,943
In the Netherlands October 28, 1948

10 Claims. (Cl. 177—353)

The invention relates to a signalling system and a signalling device pertaining to it with which signalling criteria are transmitted indicated in the signalling device by pushing keys, in consequence of which by the insertion of resistances a static criterion is given which does not end until the pushed key is released.

A signalling system of this kind is known from Netherlands patent specification 60,297. In this system for every criterion a resistance is inserted in the line, the resistance of which must be compensated beforehand at a fixed value to permit a reliable transmission of the criteria. Another system of this kind is described in Netherlands patent specification 60,512. In this signalling system the criteria are given by the insertion of resistances combined with rectifying cells in the signalling circuit in co-operation with the inversion of direction of the signalling current. This system needs, it is true, no resistance compensation of the signalling circuit, but it has the drawback that the signalling contacts always need two resting contacts and that the criteria are limited in number to ten and cannot be registered in a binary code without further provisions. Further in the receiving device this system utilizes the marginal effects of relays, which must be considered as less reliable.

Both systems have the disadvantage that the insulation of the signalling circuits, to ensure a reliable transmission of the criteria must have a resistance in value rather far above the minimum permissible in dial systems. Further the interlocking of the keys of the signalling devices against pushing more than one key at a time is difficult in both systems.

The disadvantages of both systems are avoided by the application of a signalling set containing two groups of resistances, each group consisting of four resistances and each resistance being shorted in resting position by a signalling contact, while to each of these two groups of resistances a rectifying cell has been connected in parallel, each cell conducting in an opposite direction and for each criterion always one signalling contact of either group of resistances is opened, to which criteria values are given of respectively 0, 1, 2, 3 and 0, 4, 8, 12, and the sum of the values of the opened pair of signalling contacts indicates the number of the criterion, while to the other end of the line a receiving device has been applied, which examines the criterion of the first group, offering four possibilities in two halving stages, after that effects an inversion of the signalling current in the signalling circuit with the aid of relay contacts and examines with two halving stages the criterion of the second group, offering four possibilities as well, by which proceeding a registration in the binary code takes place.

The subdivision of the criteria into two groups used in combination offers on the one hand the advantage, that in the signalling circuit broad bands of tension are available, but only by the application of an electronic examination of the received signal voltage in combination with this, which examination is very precise, for all normal subscriber's signalling circuits in an automatic telephone system, also in the case of a bad condition of the insulation of these circuits, resistance compensation can be omitted.

The precision of the signalling resistances need not be great.

On the other hand the subdivision of the criteria into two groups used in combination, with the values given above opens the possibility of a binary registration of the received criteria which is to be preferred in view of the simplicity of passing to other systems of transmitting criteria in signalling systems for automatic telephony.

With curtailment of the possibilities of application of the system the examination of the signalling voltages received may also be carried out with sensitive polarized relays with adjustable thresholds.

The subdivision of the criteria into the two given groups opens the possibility of a simple construction of the key-board with a complete interlocking of all keys.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5b is an elevation, partly in section, of the device shown in Fig. 5a;

Fig. 7b is a table for the explaining of the operation of Fig. 7a.

Figure 1:
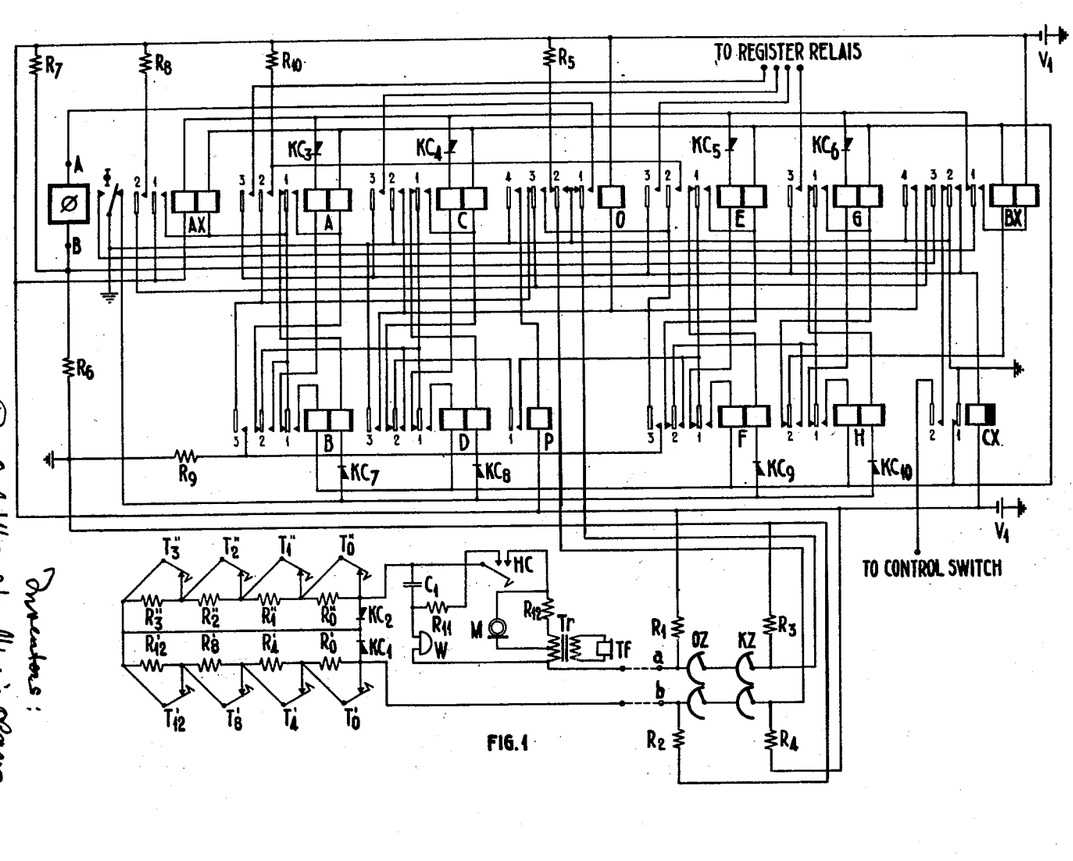
Fig. 1 shows the arrangement of the signalling system.

In Fig. 1 the arrangement of the signalling device is shown, as well as an electronic potential comparing device, connected between the points A and B and a receiving device with the relays AX to CX, inclusive, A to H, inclusive, O and P.

Figure 2:
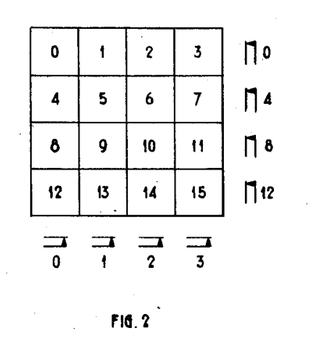
Fig. 2 shows diagrammatically the key-board of the apparatus shown in Fig. 1.

The signalling device comprises beside the normal means for calling and clearing, signalling and transmission such as a hook (HC), a bell (W), a microphone (M), a telephone (Tf) and a transformer (Tr), a key-board having, as may be seen from Fig. 2, 16 keys ranged in four rows of four. The keys control in the arrangement according to Fig. 1 two groups of four signalling contacts $T_0'$, $T_4'$, $T_8'$, $T_{12}'$, and $T_0''$, $T_1''$, $T_2''$, $T_3''$, by the opening of each of which a resistor can be inserted in the signalling circuit. To each contact T belongs a resistor R, corresponding contacts and resistors having the same subscript. Each group of resistors and contacts is bridged by a rectifying cell $KC_1$, $KC_2$, respectively.

By means of the keys of the key-board always one contact T of each group is opened at a time. The resistors $R_0'$, $R_4'$, $R_8'$, $R_{12}'$ and the contacts $T_0'$, $T_4'$, $T_8'$, $T_{12}'$ form the first group bridged by the first rectifying cell $KC_1$, whereas the other resistors $R_0''$, $R_1''$, $R_2''$, $R_3''$ and the corresponding contacts $T_0''$, $T_1''$, $T_2''$, $T_3''$ form the second group bridged by the rectifying cell $KC_2$.

The receiving device begins the examination of the signalling voltage of the line after a key in the signalling device is actuated. The examination is carried out successively with two current directions so that during the first examination the rectifying cell $KC_1$ is non-conductive and the cell $KC_2$ is conductive, the line current being determined by one of the resistors $R'$ inserted by the opening of one of the contacts $T'$. After the first examination is finished the receiver reverses the direction of the line current, so that the rectifying cell $KC_1$ is conductive and $KC_2$ is non-conductive, the line current being determined by one of the resistors $R''$ inserted by the opening of one of the contacts $T''$. The sum of the lower indexes of the opened contacts T or of the inserted resistors R indicates the number of the criterion. The values of the resistors are equal in pairs, i. e. $R_0'=R_0''$, $R_4'=R_1''$, $R_8'=R_2''$, $R_{12}'=R_3''$. The systematical distribution of the signalling resistors in two groups, and the fact that every signal criterion is constituted by a criterion of each group permits, on the one hand, the construction of the apparatus according to the invention, while on the other hand it allows a registration of the criteria in the binary code without any trouble. For this purpose contacts $T_{12}'$ and $T_3''$ are provided, respectively, on one side of each group of contacts $T'$ and $T''$. However, the criterion corresponding to these contacts could also be obtained by opening the contacts $T_4'+T_8'$, and $T_1''+T_2''$, respectively. On the other side of each group contacts $T_0'$ and $T_0''$, respectively, are provided which by the opening thereof indicate that a selection is made which does not involve a particular criterion of the first or second group, respectively. Thus it is seen that only the contacts $T_4'$, $T_8'$, $T_1'$ and $T_2''$ are of fundamental importance and constitute the basis of the binary registration.

Before describing the receiving device according to Fig. 1 more in detail, it is remarked that the shown arrangement is intended for an automatic telephone system and particularly for the transmission of the selecting criteria from a subscriber's set, for instance to a register in a central exchange. In such a system fixed resistors $R_1$ and $R_2$ of e. g. 15,000 ohms are connected, respectively, to the $a$-wire and $b$-wire of the signalling circuit. Between the line and the receiving device furthermore a call finder OZ and a cord-finder KZ are inserted.

In the rest position of the signalling circuit the $a$-wire is connected to ground via the contact $o_1$ of a relay O, the $b$-wire via the contact $o_2$ of the relay O, and a resistor $R_5$ (5,000 ohms) to the negative terminal of a voltage source $V_1$, the positive terminal of which is connected to ground. The relay O can reverse the polarity of the line current by means of the contacts $o_1$ and $o_2$. Resistors $R_3$ and $R_4$, each of 15,000 ohms, are provided in order to obtain the same electric conditions of the signalling circuit for the reversed polarity. In one condition resistor $R_4$ is connected parallel to resistor $R_5$, in the other resistor $R_1$ parallel to resistor $R_5$ with a resistance of 3,750 ohms in either case as a resultant. The resistors $R_2$, $R_3$, each of 15,000 ohms, form a fixed leakage in the signalling circuit. The combination of the resistors $R_1$ to $R_5$ and the voltage source, which supplies 60 v., may be replaced for further calculations by a voltage source of 48 volts with an internal resistance of 3000 ohms.

The potential produced in the signalling circuit by the insertion of a pair of resistors $R'$ and $R''$ of the signalling device is checked at the point A with the aid of an electronic comparing device to be called zero switch hereinafter. For further explanation of the invention it suffices to mention that a contact $\phi$ controlled by the zero-switch is in the position shown in Fig. 1 if the potential of the point A is less negative than that of the point B, while this contact is turned over at a high speed (e. g. in less than 1 millisecond) from the position shown if the potential of the point A becomes more negative than that of point B. Thus the potential of the point A is continuously compared with that of the point B. The comparison potentials of the point B are derived from a potentiometer, consisting of the resistors $R_6$ to $R_{10}$ inclusive, and contacts of the relays AX, BX, A, B, O, E and F, which contacts are connected in series with the resistors $R_8$, $R_9$, $R_{10}$, respectively, as shown in Fig. 1.

Figure 3:
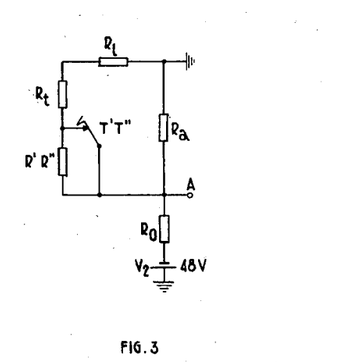
Fig. 3 is a simplified diagram of the subscriber's station, the signally circuit and the receiving resistances in the central office.

In Fig. 3 simplified diagram of the subscriber's station is shown.

In this diagram:

$R_1$ is the resistance of the subscriber's line.

$Ra$ is the leakage resistance of the subscriber's line.

$Ro$ and the voltage source $V_2$ of 48 volts are a substitute for the resistors $R_1$ and $R_5$ and the voltage source $V_1$ of 60 volts.

Figure 4:
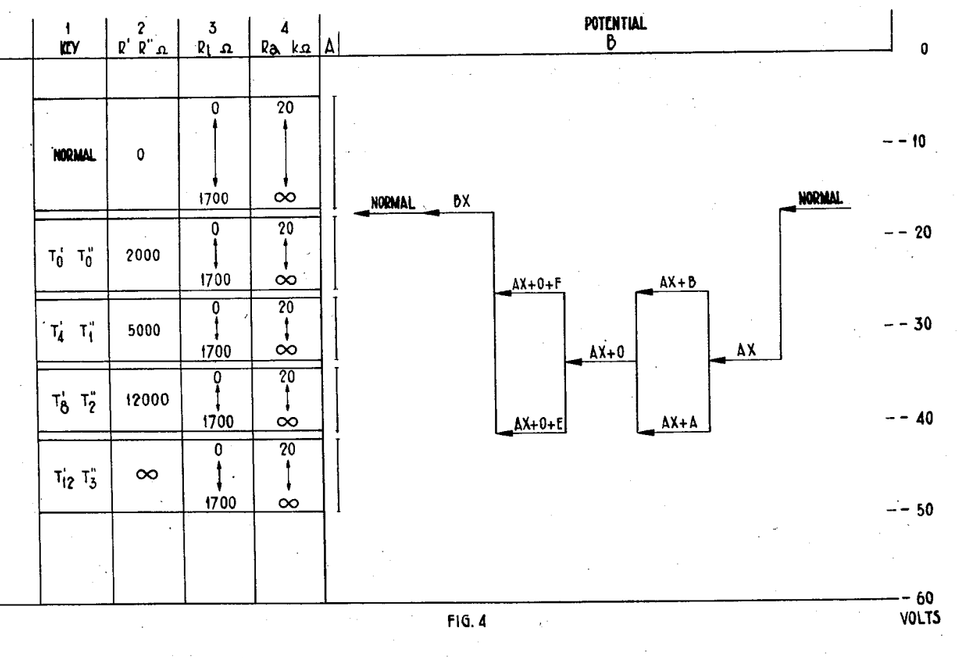
Fig. 4 is a potential diagram for explaining the operation of the arrangement shown in Fig. 1.

Figure 4 is a diagram of the signalling voltages and the corresponding comparison voltages in different stages of the reception of a criterion:

1. The potential of the point A as a function of the chosen figure (columns 1 and 2), the line resistance (column 3) and the leakage resistance (column 4).

2. The potential of the point B as a function of the operating condition of the receiving device according to Fig. 1.

In the rest position of the signalling circuit and the receiving device the potential of the point B is only determined by the values of the resistors $R_6$ and $R_7$, being e. g. 1940 and 4060 ohms, respectively.

At a battery voltage of —60 volts with respect to ground, the point B has then a potential of —19.4 volts. As long as the point A has a potential between ground and —19.4 volts, the contact $\phi$, which controls the receiving device will be in the rest position thereof. The receiving device consists of a starting relay AX, a stopping relay BX, pairs of receiving relays A—B and C—D (termed hereinafter the first, second, third and fourth receiving relay, respectively) for the examination of the criterion indicated by the inserted resistor R' in the signalling device, the relay O for the reversion of the polarity of the battery voltage, a relay P for the delayed start of the examination of the signalling potential indicated by the inserted resistance R" by the pairs of receiving relays E—F and G—H (termed hereinafter the fifth, sixth, seventh, and eighth receiving relay, respectively) and an auxiliary relay CX for the actuation of a control switch of a register which makes the desired connection.

For the rest position of the receiving device the signalling circuit including the signalling device with the handset HC taken off but without a key being pushed, has a maximum resistance of 2000 ohms. In this case the rest signal potential will be —19.2 volts. The insulation resistance of the signalling circuit converted to a leak resistance between the two wires and applied at the place where it has the most injurious influence on the transmission of the criteria, i. e. at the side of the central office, may have a minimum value of 20,000 ohms. More unfavorable values of the insulation faults may be tolerated if these faults occur closer to the signalling device, which is practically the case as a rule.

The signal potentials obtained at the central office at the point A of the arrangement in consequence of the pushing of a key of the set, are examined by the zero switch. As all the signal voltages have a greater negative value than —19.4 volts the contact $\phi$ is turned over from the shown position so that an operating signal for the starting relay AX of the receiving arrangement is given via the front contact of $\phi$ and the back contact of $bx$. The relay AX attracts the armature thereof and via contact $ax1$ a holding circuit for the second winding of the relay AX is closed and at the same time a voltage is applied to the first pair of relays A—B of the receiving arrangement.

The contact $ax2$ connects the resistor $R_8$ parallel to the resistor $R_7$ so that the comparison potential of the point B changes to —34.0 volts.

The zero-switch ascertains now whether the signal potential at the point A lies between —19.4 and —34.0 volt or between —34.0 and —48.0 volts. The potential of —48.0 volts is the minimum signal potential occurring in the case of an open signalling circuit. In the first case the contact $\phi$ returns to the position shown in Fig. 1 immediately after the contact $ax2$ is closed. In the second case the contact $\phi$ remains turned over from the position shown in the drawing and a signal is given either for the relay B, or for the relay A. Whatever criterion is given, one of these two relays will always attract the armature thereof. If the relay A attracts the armature thereof, the same closes a holding circuit for the second winding of relay A via the front contact of $a1$, whereas the back contact of $a1$ interrupts the circuit of the relay B for the duration of the receiving cycle. If the relay B attracts the armature thereof a holding circuit is closed for the second winding of this relay via the front contact of $b1$, whereas the back contact of $b1$ keeps the operating circuit of the relay A interrupted for the duration of the receiving cycle. Either via the front contact of the contact $a1$ or via that of contact $b2$ the voltage is applied to the next pair of relays C—D.

If the relay A attracts the armature thereof, the comparison potential of the point B is modified by the contact $a2$ and the insertion of the resistor $R_{10}$ (2550 ohms). If the battery voltage is 60 volts, the potential of point B is changed to —40.5 volts. If, however, the relay B attracts the armature thereof, the comparison potential of the point B is modified to —27.75 volts owing to the insertion of the resistor $R_9$ (3650 ohms) by the contact $b3$.

In the first case the zero switch examines whether the signal potential occurring at the point A is more or less negative than —40.5 volts (viz between —40.5 and —48.0 volts or between —34.0 and —40.5 volts) and in the second case whether the signal potential is more or less negative than —27.75 volts (viz between —34.0 and —27.75 volts or between —19.4 and —27.75 volts).

Now in the registering arrangement either the relay C or the relay D attracts the armature thereof, whereby either via contacts $c1$ or via contact $d2$ a voltage is supplied to a contact $p1$ controlled by a delayed starting relay P. As long as, however, the contact $p1$ is open, the examination of the criterion cannot be continued.

As always one of the two relays C or D attracts the armature thereof, either the contact $c2$ or the contact $d3$ closes an operating circuit for the relay O, which preferably operates rapidly and attracts the armature thereof which with the contacts $o1$ and $o2$ reverses the polarity of the signalling circuit as an introduction to the examination of the signal potential which is caused by the insertion of one of the resistors R" in the signal sender. It should be noted that by the reversal of the polarity the rectifying cells $KC_1$ and $KC_2$ have interchanged the conductivity thereof.

The contact $o3$ of the relay O switches the comparison potential of the point B back to —34 volts. This is the value reached after the operation of the relay AX.

The contact $o4$ of the relay O closes a circuit for the relay P, which closes with the contact $p1$ a circuit for the two last pairs of relays E—F and G—H.

Thus the examination of the criterion obtained after the inversion of the polarity of the signalling circuit is carried out after a delay constituted by the time of attraction of the armature of the relay P. This delay, as well as that caused by the attraction of the armature of the relay AX is necessary to ensure that the ringing phenomenon caused, respectively, by the pushing of a key in the signalling device and the inversion of the polarity of the signalling circuit at the central office, is ended when the zero switch carries out the potential comparison between the points A and B.

The zero switch, in cooperation with the pairs of relays E—F and G—H executes the same examination of the signal potentials indicated by one of the resistors R'' in the signal sender as was done by the zero switch in cooperation with the pairs of relays A—B and C—D with the signal potentials indicated by the resistors R'.

When the second examination is finished a circuit is closed for the stopping relay BX, either via the contact $g1$ or via the contact $h2$. The attraction of the armature by the relay BX indicates the end of a receiving cycle. Via the front contacts of the contact $\phi$ and the contact $bx1$ a holding circuit is closed for the relay BX. Via the contacts $bx2$ the combination of contacts $a3$, $c3$, $g3$ is grounded, which contacts lead to groups of four register relays, by which the chosen criteria can be recorded. At the same time this contact closes a circuit for the auxiliary relay CX, which interrupts with the contact $cx1$ thereof the holding circuits of the relays A to G, inclusive. Via the contact $bx4$ of relay BX the relay O is held energized. All the relays of the combination, except relay BX, CX, O and P return to the rest position thereof.

When the relay BX attracts the armature thereof the contact $bx3$ interrupts the potentiometer for the comparison potential so that the comparison potential of the rest position is applied to the signalling circuit at the point B. Whichever key of the signal sender was pushed, as long as the same is depressed the contact $\phi$ remains turned over from the position shown in Fig. 1 and the relay BX is held via the contact $bx1$ and the holding winding thereof. This holding circuit is interrupted by the contact $\phi$ only after the key is released. A circuit is closed for moving the control switch. Via the back contact of the contact $bx2$ and the still closed contact $cx2$ of the relay CX, which releases its armature with some delay. After the relay CX releases its armature the arrangement is ready for the reception of the next criterion.

In view of the occurrence of insulation faults in the lines the resistors in the apparatus are preferably chosen as follows:

$R_0' = R_0'' = 2000$ ohms; $R_4' = R_1'' = 5000$ ohms
$R_8' = R_2'' = 12000$ ohms and $R_{12}' = R_3'' = 00$ ohm The tolerances of these resistors may amount to + or —5%. Wider limits of these resistance tolerances may be provided, if necessary. By this choice of the resistors it is achieved that with an apparatus having a resistance of the transmission parts permanently taken up in the signalling circuit of 300 ohms, a line resistance between 0 and 1700 ohms, a leakage between the $a$-wire and $b$-wires and from the $a$-wire to ground as well as from the $b$-wire to ground converted into a leakage resistance between the $a$ and $b$ wires of 20,000 ohms as a minimum, the signal potentials lie within the limits of the comparison potentials pertaining to them. By the application of these wide limits it is not necessary to apply a compensation of the resistance of the signalling circuit.

The value chosen for $R_{12}' = R_3'' = 00$ ohms may cause some difficulties, since this criterion is equivalent to a line interruption such as that occurring if during the selection the caller in an automatic signalling system interrupts the connection again for some reason or other. If the caller in an automatic system terminates the call during the selection, the register arrangement remains locked at the relays BX and CX. If the number of criteria to be transmitted is limited to 10, the register arrangement will, in the case of a line interruption, determine a criterion higher than ten. From this the register can easily deduce that the connection was broken. If, however, more than ten criteria are needed, the highest criterion may be reserved for signalling a line interruption during the selection. If, however, this one too must remain available for the regular transmission of the criteria, a supervision must be introduced against a signal key being held for too long a time. As a matter of fact, a line interruption is equivalent to a key being held for too long a time.

Furthermore in cases where the number of criteria to be transmitted is less than 16 and e. g. 12 or less criteria are sufficient, it is possible to arrange the subscriber's station and the receiving potentiometer so that only four potential bands are needed.

Figure 7A:
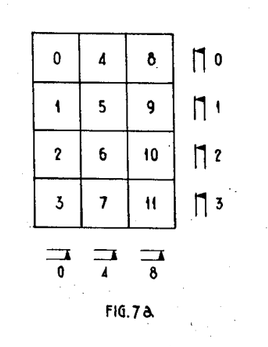
Fig. 7a is a diagram corresponding to Fig. 2 for a selection with 12 criteria.
Figure 7B:
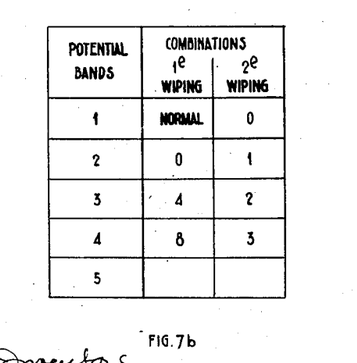

The grouping of the keys and the contacts pertaining to them is shown in Fig. 7a, while in Fig. 7b the distribution of the potential bands is shown. The criteria of the first group need a rest position, a zero and the criteria 4 and 8, whereas those of the second group need no rest position. Thus the zero of the second group of criteria may be chosen equal to the rest position of the first group, so that four potential bands are needed for both the groups of criteria with which twelve criteria can be transmitted.

Figure 5A:
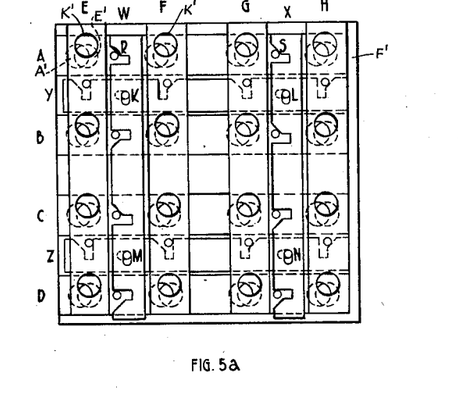
Fig. 5a is a plan view of a key-board to be used in connection with and as part of Fig. 1, the cover being omitted for the sake of clearness.
Figure 5B:
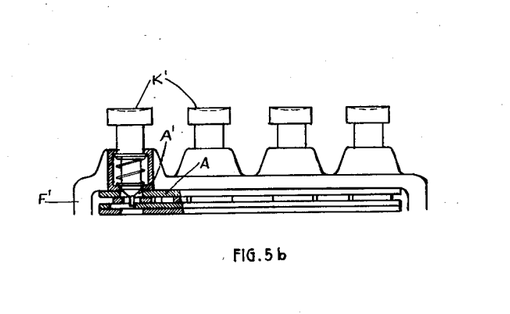
Figure 5C:
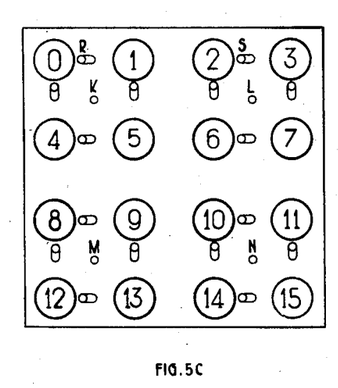
Fig. 5c is a plan view of the key-board shown in Figs. 5a and 5b.

The signalling device may be designed so that each key always controls the two contacts pertaining to it while after a key is pushed all the other keys are locked. In Fig. 5a a design of the signalling device is diagrammatically shown in which by depressing one of the keys $K^1$ arranged in four rows and four columns, two bars of a set consisting of twice four flat signalling bars, termed hereinafter the first bars A—D and the second bars E—H, can be moved in two parallel planes in directions perpendicular to each other. The movement of the flat bars can be guided in a fixed frame $F^1$ (Figs. 5b and 5c) by means of pins such as R and S fixed to the bars. The controlling ends of the keys are shaped as cones as can be seen from Fig. 5b. The flat signalling bars such as A and E are provided with round holes such as A' and E', the center lines of which are displaced with respect to the center lines of the corresponding keys by a slight distance, so that when a key $K^1$ is pushed the flat signalling bars such as A and E are displaced in such a direction that the center lines of the holes such as A' and E' in the bars coincide approximately with that of the key $K^1$. All the holes in a signalling bar are displaced with respect to that of the corresponding key, so that all the bars of the two groups of four may be designed similar to one another. By application of four flat bars, as shown in Fig. 5a it is achieved that each key causes by the pushing thereof a displacement of a combination of two bars, the combinations being different from one another. The signalling bars control signalling contacts, respectively, which as shown in principle in Fig. 2, can be connected to the various bars so that the value of the transmitted criterion indicated in Fig. 2 is represented by the keys, respectively.

It is necessary to lock the keys $K^1$ of the signalling device of the system according to the invention when one key is pushed. This can be done according to the invention by locking the signalling bars. For this purpose two pairs of locking bars, termed hereinafter the first locking bars Y, Z and the second locking bars W, X and belonging, respectively, to the groups of four signalling bars E to H, inclusive, and A to D, inclusive, are provided. The locking bars W, X and Y, Z are different, respectively, whereas the locking bars W, Y and X, Y are similar, respectively. The pair of locking bars W and X is arranged in the spaces between the signalling bars of the set to which it does not belong, i. e. E to H, inclusive, whereas the pair of locking bars Y and Z is arranged between the signalling bars of the set A to D, inclusive, to which it does not belong. Each locking bar is movable on two of four fixed pins K, L, M, N in the frame $F^1$ of the signal sender. As is to be seen from Fig. 5a only four pins are required in all.

The pins such as R and S attached to the signalling bars such as the signalling bar A control the locking bars W and X. The key at the place O (Fig. 5c) moves the bar A to the right when the key is pushed. In consequence thereof the pins R and S move the bars W and X upwards (Fig. 5a) so that the other signalling bars B, C, D of the group are locked. The locking of the signalling bar B is effected by the bar W, that of the signalling bar C by the bar X, and that of the signalling bar D by the bar W as well as by the bar X. It can easily be seen that in a similar way the pushing of a key in one of the other horizontal rows causes the locking of the other horizontal signalling bars.

The set of signalling bars E to H, inclusive, as well as the locking bars Y and Z belonging to the same are displaced by a quarter turn with respect to the first set, so that the pushing of a key causes similarly the locking of the other vertical signalling bars. As after a key has been pushed all the signalling bars are locked except the two controlled ones, it is no longer possible to push another key.

Figure 5D:
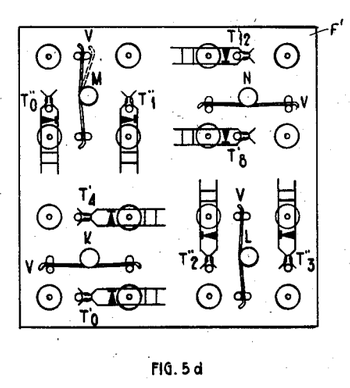
Fig. 5d is a bottom view of the key-board shown in Figs. 5a–c.

The locking bars W, X, Y, Z need no springs for the fixing of the normal position, but the signalling bars A—D and E—H do. These springs can be applied in a simple way, as is shown in Fig. 5d by extending the fixed pins K, L, M, N, along which the locking bars can move through the bottom of the frame $F^1$. The moving pins of the signalling bars A—D and E—H are extended through the bottom of the frame $F^1$ as well. Thus it is possible to apply a spring in form of a straight piece of elastic steel wire V between the pins of two adjoining signalling bars, which wire is guided by one of the fixed pins K, L, M or N in the manner indicated in Fig. 5d. As each spring effects the return to the normal position of two signalling bars, only four springs are needed in all.

The springs exert no couples on the signalling bars, so that a returning to the normal position of the bars is accomplished.

The moving pin extended through the bottom of the frame to keep the signalling bars at their place can also be used for the actuation of the signalling contacts. The signalling contacts $T_0'$ to $T_3''$ can be placed as shown in Fig. 5d. It should be noted that it is not possible to use the springs of the signalling contacts as returning springs for the signalling bars. The signalling contacts may not come into operation until the key is pushed down so far that the interlocking of the keys is ensured.

Figure 6:
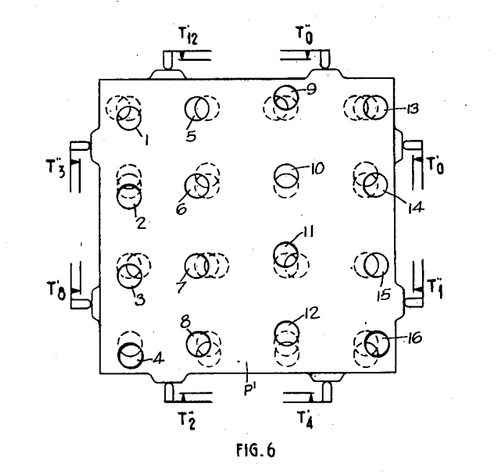
Fig. 6 is another embodiment of the key-board.

In another embodiment of the signal sender signalling plates are used instead of signalling bars, for instance with 16 holes serving for the control of the movement of the plates with the aid of a corresponding number of keys. Fig. 6 shows the design of the signalling plates of this embodiment. The holes in the signalling plates $P^1$, which are preferably square, but may have a circular shape as shown, are arranged in four rows of four.

The holes 1–4 of the first vertical row in the upper signalling plate $P^1$ are displaced downwards with their centers, with respect to the centers of the keys moving in a direction on the signalling plate which is perpendicular to the displacement of the holes 1–4, so that the depression of a key of the first row effects an upward movement of the plate. The holes 5–8 of the second vertical row are displaced with their centers to the left, so that the depression of a key of this row effects a movement of the upper signalling plate to the right; the holes 9–12 of the third row are displaced with their centers upward and the holes 13–16 of the fourth row are displaced with their centers to the right with respect to the corresponding keys, so that by pushing down a key, respectively, a movement of the signalling plate downward or to the left can be obtained. Of course, the placing of the holes in the different rows may be interchanged at will.

The lower signalling plate can be made similar to the upper one, but it should be displaced by a quarter turn with respect to the upper plate. The operation of the lower signalling plate is the same as that of the upper signalling plate. The holes in the lower signalling plate are dotted in Figure 6.

By placing the two signalling plates in the manner described it is achieved that the pushing of a key causes a combination of two movements of the two signalling plates, being different for each of the keys and being adapted to the signalling system according to the invention. In Fig. 6 the signalling contacts T' and T'' with their denominations are diagrammatically shown.

The upper signalling plate, controlled by the conical end of the key, comes earlier into operation than the lower one. The upper signalling bar of the signal sender according to Figs. 5a–d comes equally earlier into operation than the lower one for the same reason as in the embodiment according to Fig. 6. If the upper signalling plate or the upper signalling bar always operates a contact of the group determined last by the receiving device, difficulties can never arise, because the receiving device is not started for making a receiving cycle until a contact of the group to be determined first by the receiving device is opened.

We claim:

1. A signalling system, comprising in combination, a subscriber's station; a central station; conductors connecting said subscriber's station to said central station; means arranged at said subscriber's station for selecting and transmitting coded digits, said selecting means including two groups of series-connected resistors and contacts shunting, respectively, said resistors; signalling bars controlling said contacts, said resistors dividing a predetermined potential so as to obtain a potential corresponding to the selected coded digits, respectively; a receiving device arranged at said central station, said receiving device including an electronic potential comparing device; means for supplying comparison potentials to said electronic potential comparing device; and means for disconnecting said means for supplying comparison potentials from said electronic voltage comparing device and connecting said electronic voltage comparing device to a predetermined potential.

2. A signalling system, comprising a combination, a subscriber's station; a central station; conductors connecting said subscriber's station to said central station; means arranged at said subscriber's station for selecting and transmitting coded digits, said selecting means including two groups of series-connected resistors and contacts shunting, respectively, said resistors; signalling bars controlling said contacts, said resistors dividing a predetermined potential so as to obtain a potential corresponding to the selected coded digits, respectively; a receiving arrangement arranged in said central station and including an indication device for indicating the electrical condition of said conductors and an electronic potential comparing device controlling said indicating device; means for supplying comparison potentials to said electronic potential comparing device; first switching means for modifying said comparison potentials, said first switching means being controlled by said indication device; and second switching means for disconnecting said means for supplying comparison potentials from said electronic potential comparing device and connecting said electronic voltage comparing device to a predetermined potential being under control of said indication device.

3. A signalling system, comprising in combination, a subscriber's station; a central station; conductors interconnecting said stations, said conductors having electrical balancing means arranged in said central station, said subscriber's station having means for selecting and transmitting coded numbers, said selecting means including two groups each including four resistors connected in series, and contacts shunting, respectively, said resistors; signalling bars controlling said contacts, said resistors dividing a predetermined potential so as to obtain potentials corresponding, respectively, to the selected coded numbers; two rectifiers each shunting one of said groups of resistors and conducting current in opposite sense; means in said central station for supplying a current to said resistors; a receiving arrangement arranged in said central station and including an electronic potential comparing device and a sequential circuit of pairs of relays indicating the electrical condition of said conductors; a starting relay connected to said receiving arrangement; a first switching relay connected in the output of said electronic potential comparing device and having an armature operating said starting relay; a holding circuit of said starting relay, said holding circuit being completed after operation of said starting relay, said armature of said first switching relay selecting the relay of each of said pairs of receiving relays which is to be operated; two contacts controlled by said first switching relay preparing operating circuits for one relay of each of said pairs of receiving relays, said sequential circuit of receiving relays including a first group of two pairs of receiving relays for indicating the electrical condition of said conductors obtained by the one of said groups of resistors under supervision by said starting relay, one of each pair of relays being operated, the operating one of said first pair preparing an operating circuit for the second pair of receiving relays; contacts of said second pair of relays of said first group of receiving relays; a current inverting relay operated by one of said contacts, said current inverting relay inverting the direction of the supplied current after the electrical condition of said conductors obtained by the one of said groups of resistors has been indicated by said sequential circuit of said first group of receiving relays being closed; a second switching relay relay operated by said current inverting relay and interconnecting with a short delay said sequential circuit of receiving relays, said sequential circuit including a second group of two pairs of receiving relays indicating the electrical condition of said conductors obtained by the other of said groups of resistors under supervision of said second switching relay, whereupon one of each pair of relays is operated, the operating relay of said first pair preparing an operating circuit for said second pair of receiving relays; a stopping relay; contacts of said second pair of said second group of receiving relays for closing an operating circuit for said stopping relay, the latter restoring said sequential circuit of receiving relays to normal and interrupting the operating winding of said starting relay by holding itself under the control of said first switching relay as long as the condition of said conductor has not been restored to normal; a first potentiometer for supplying comparison potentials to said potential comparing device; contacts of the first pair of said first group of receiving relays for shunting parts of said first potentiometer; a second potentiometer for supplying comparison potentials to said second group of receiving relays for shunting parts of said second potentiometer; a contact of said current inverting relay for connecting one of said two potentiometers to said potential comparing device; and a contact of said stopping relay for disconnecting said potentiometer connected to said potential comparing device and for connecting said potential comparing device to a source of predetermined potential.

4. A signalling system operating in a binary code, comprising in combination, a signalling device having means for producing signalling potentials, said means including a first group including a plurality of resistors connected in series to one another and a plurality of signalling contacts short-circuiting, respectively, said resistors of said first group, a second group including a plurality of resistors connected in series to one another and a plurality of signalling contacts short-circuiting, respectively, said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; a receiving device including means producing comparison potentials; means for comparing the signalling potentials produced by said signalling device with the comparison potentials produced by said producing means of said receiving device; a reversing relay forming part of said receiving device; means for energizing said reversing relay after the first signalling potential produced by said first group has been compared to the comparison potential; and contacts controlled by said reversing relay and arranged for reversion of the voltage applied to said groups of said signalling device, whereby first said first group of said signalling device produces the first signalling potential which is compared to the comparison potential by said comparing means, then said reversing relay is energized so as to render said second group of said signalling device operative in order to produce the second signalling potential, and finally said second signalling potential is compared to the comparison potential by said comparing means.

5. A signalling system operating in a binary code, comprising in combination, a signalling device having means for producing signalling potentials, said means including a first group including four resistors connected in series to one another and four signalling contacts short-circuiting, respectively, said resistors of said first group, a second group including four resistors connected in series to one another and four signalling contacts short-circuiting respectively, said resistors of said second group, said resistors of said first group having, respectively, the same resistance value as said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; a receiving device including a potentiometer arrangement producing comparison potentials; an electronic arrangement for comparing the signalling potentials produced by said signalling device with the comparison potentials produced by said potentiometer arrangement of said receiving device; a switch-over contact controlled by said electronic arrangement and having a front position and a back position; a starting relay forming part of said receiving device and being energized by said switch-over contact in the front position thereof; a contact controlled by said starting relay; a resistor forming part of said potentiometer arrangement and being connected in series to said contact controlled by said starting relay so as to be connected in parallel to a branch of said potentiometer arrangement upon energization of said starting relay, whereby the comparison potential is changed; a reversing relay forming part of said receiving device; means for energizing said reversing relay after the first signalling potential produced by said first group has been compared to the comparison potential; and contacts controlled by said reversing relay and arranged for reversion of the voltage applied to said groups of said signalling device, whereby first said first group of said signalling device produces the first signalling potential which is compared to the comparison potential by said electronic arrangement, then said reversing relay is energized so as to render said second group of said signalling device operative in order to produce the second signalling potential, and finally said second signalling potential is compared to the comparison potential by said electronic arrangement.

6. A signalling system operating in a binary code, comprising in combination, a signalling device having means for producing signalling potentials, said means including a first group including four resistors connected in series to one another and four signalling contacts short-circuiting, respectively, said resistors of said first group, a second group including four resistors connected in series to one another and four signalling contacts short-circuiting, respectively, said resistors of said second group, said resistors of said first group having, respectively, the same resistance value as said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; a receiving device including a potentiometer arrangement producing comparison potentials; an electronic arrangement for comparing the signalling potentials produced by said signalling device with the comparison potentials produced by said potentiometer arrangement of said receiving device; a switch-over contact controlled by said electronic arrangement and having a front position and a back position; a starting relay forming part of said receiving device and being energized by said switch-over contact in the front position thereof; a contact controlled by said starting relay; a resistor forming part of said potentiometer arrangement and being connected in series to said contact controlled by said starting relay so as to be connected in parallel to a branch of said potentiometer arrangement upon energization of said starting relay, whereby the comparison potential is changed; a first receiving relay and a second receiving relay having contacts, respectively, and being connected to each other over part of said contacts of said first and second receiving relays and to said switch-over contact so that one of said first and second receiving relays is energized at a time, the other of said first and second receiving relays being de-energized; a reversing relay forming part of said receiving device; means for energizing said reversing relay after the first signalling potential produced by said first group has been compared to the comparison potential; and contacts controlled by said reversing relay and arranged for reversion of the voltage applied to said groups of said signalling device, whereby first said first group of said signalling device produces the first signalling potential which is compared to the comparison potential by said electronic arrangement, then said reversing relay is energized so as to render said second group of said signalling potential operative, and finally said second signalling potential is compared to the comparison potential by said electronic arrangement.

7. A signalling system operating in a binary code, comprising in combination, a signalling device having means for producing signalling potentials, said means including a first group including four resistors connected in series to one another and four signalling contacts short-circuiting, respectively, said resistors of said first group, a second group including four resistors connected in series to one another and four signalling contacts short-circuiting, respectively, said resistors of said second group, said resistors of said first group having, respectively, the same resistance value as said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; a receiving device including a potentiometer arrangement producing comparison potentials; an electronic arrangement for comparing the signalling potentials produced by said signalling device with the comparison potentials produced by said potentiometer arrangement of said receiving device; a switch-over contact controlled by said electronic arrangement and having a front position and a back position; a starting relay forming part of said receiving device and being energized by said switch-over contact in the front position thereof; a contact controlled by said starting relay; a resistor forming part of said potentiometer arrangement and being connected in series to said contact controlled by said starting relay so as to be connected in parallel to a branch of said potentiometer arrangement upon energization of said starting relay, whereby the comparison potential is changed; a first receiving relay and a second receiving relay having contacts, respectively, and being connected to each other over part of said contacts of said first and second receiving relays and to said switch-over contact so that one of said first and second receiving relays is energized at a time, the other of said first and second receiving relays being de-energized; two resistors connected in series, respectively, to one of said contacts of said first and second receiving relays and in parallel to the branches of said potentiometer arrangement so as to change the comparison potential by the closing of said one of said contacts of said first and second receiving relays, respectively; a reversing relay forming part of said receiving device; means for energizing said reversing relay after the first signalling potential produced by said first group has been compared to the comparison potential; and contacts controlled by said reversing relay and arranged for reversion of the voltage applied to said groups of said signalling device, whereby first said first group of said signalling device produces the first signalling potential which is compared to the comparison potential by said electronic arrangement, then said reversing relay is energized so as to render said second group of said signalling device operative in order to produce the second signalling potential, and finally said second signalling potential is compared to the comparison potential by said electronic arrangement.

8. A signalling system operating in a binary code, comprising in combination, a signalling device having means for producing signalling potentials, said means including a first group including four resistors connected in series to one another and four signalling contacts short-circuiting, respectively, said resistors of said first group, a second group including four resistors connected in series to one another and four signalling contacts short-circuiting, respectively, said resistors of said second group, said resistors of said first group having, respectively, the same resistance value as said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; a receiving device including a potentiometer arrangement producing comparison potentials; an electronic arrangement for comparing the signalling potentials produced by said signalling device with the comparison potentials produced by said potentiometer arrangement of said receiving device; a switch-over contact controlled by said electronic arrangement and having a front position and a back position; a starting relay forming part of said receiving device and being energized by said switch-over contact in the front position thereof; a contact controlled by said starting relay; a resistor forming part of said potentiometer arrangement and being connected in series to said contact controlled by said starting relay so as to be connected in parallel to a branch of said potentiometer arrangement upon energization of said starting relay, whereby the comparison potential is changed; a first receiving relay and a second receiving relay having contacts, respectively, and being connected to each other over part of said contacts of said first and second receiving relays and to said switch-over contact so that one of said first and second receiving relays is energized at a time, the other of said first and second receiving relays being de-energized; two resistors connected in series, respectively, to one of said contacts of said first and second receiving relays and in parallel to the branches of said potentiometer arrangement so as to change the comparison potential by the closing of said one of said contacts of said first and second receiving relays, respectively; a third receiving relay and a fourth receiving relay having contacts, respectively, and being connected to each other over part of said contacts of said third and fourth receiving relays and to said switch-over contact so that one of said third and fourth receiving relays is energized at a time, the other of said third and fourth receiving relays being de-energized; a reversing relay forming part of said receiving device; means including one of said contacts of said third receiving relay and one of said contacts of said fourth receiving relay, said contacts being connected in parallel to each other and in series to said reversing relay, for energizing said reversing relay after the first signalling potential produced by said first group has been compared to the comparison potential; and contacts controlled by said reversing relay and arranged for reversion of the voltage applied to said groups of said signalling device, whereby first said first group of said signalling device produces the first signalling potential which is compared to the comparison potential by said electronic arrangement, then said reversing relay is energized so as to render said second group of said signalling device operative in order to produce the second signalling potential, and finally said second signalling potential is compared to the comparison potential by said electronic arrangement.

9. A signalling system operating in a binary code, comprising in combination, a signalling device having means for producing signalling potentials, said means including a first group including four resistors connected in series to one another and four signalling contacts short-circuiting, respectively, said resistors of said first group, a second group including four resistors connected in series to one another and four signalling contacts short-circuiting, respectively, said resistors of said second group, said resistors of said first group having, respectively, the same resistance value as said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; a receiving device including a potentiometer arrangement producing comparison potentials; an electronic arrangement for comparing the signalling potentials produced by said signalling device with the comparison potentials produced by said potentiometer arrangement of said receiving device; a switch-over contact controlled by said electronic arrangement and having a front position and a back position; a starting relay forming part of said receiving device and being energized by said switch-over contact in the front position thereof; a contact controlled by said starting relay; a resistor forming part of said potentiometer arrangement and being connected in series to said contact controlled by said starting relay so as to be connected in parallel to a branch of said potentiometer arrangement upon energization of said starting relay, whereby the comparison potential is changed; a first receiving relay and a second receiving relay having contacts, respectively, and being connected to each other over part of said contacts of said first and second receiving relays and to said switch-over contact so that one of said first and second receiving relays is energized at a time, the other of said first and second receiving relays being de-energized; two resistors connected in series, respectively, to one of said contacts of said first and second receiving relays and in parallel to the branches of said potentiometer arrangement so as to change the comparison potential by the closing of said one of said contacts of said first and second receiving relays, respectively; a third receiving relay and a fourth receiving relay having contacts, respectively, and being connected to each other over part of said contacts of said third and fourth receiving relays and to said switch-over contact so that one of said third and fourth receiving relays is energized at a time, the other of said third and fourth receiving relays being de-energized; a reversing relay forming part of said receiving device; means including one of said contacts of said third receiving relay and one of said contacts of said fourth receiving relay, said contacts being connected in parallel to each other and in series to said reversing relay, for energizing said reversing relay after the first signalling potential produced by said first group has been compared to the comparison potential; contacts controlled by said reversing relay and partly arranged for reversion of the voltage applied to said groups of said signalling device; a delayed starting relay connected in series to one of said contacts controlled by said reversing relay so that said delayed starting relay attracts the armature thereof at a predetermined time after energization of said reversing relay; a contact controlled by said armature of said delayed starting relay and connected in series to the junction of said third and fourth receiving relays; a fifth receiving relay and a sixth receiving relay having contacts, respectively, and being connected to each other over part of said contacts of said fifth and sixth receiving relays, the junction of said fifth and sixth receiving relays being connected to said contact controlled by said armature of said delayed starting relay, whereby the junction of said fifth and sixth receiving relays is connected to the junction of said third and fourth receiving relays with a predetermined time delay, said fifth and sixth receiving relays being connected to said switch-over contact so that one of said fifth and sixth receiving relays is energized at a time at a predetermined time delay after energization of said third and fourth receiving relays; and a seventh receiving relay and an eighth receiving relay having contacts, respectively, and being connected to each other over parts of said contacts of said seventh and eighth receiving relays and to said switch-over contact so as to energize one of said seventh and eighth receiving relays at a time together with one of said fifth and sixth receiving relays, whereby first said first group of said signalling device produces the first signalling potential which is compared to the comparison potential by said electronic arrangement, then said reversing relay is energized so as to render said second group of said signalling device operative in order to produce the second signalling potential, and finally said second signalling potential is compared to the comparison potential by said electronic arrangement.

10. A signalling system operating in a binary code, comprising in combination, a double line having a first wire and a second wire; a signalling device connected to said double line and having means for producing signalling potentials, said means including a first group including a plurality of resistors connected in series to one another and a plurality of signalling contacts short-circuiting, respectively, said resistors of said first group, a second group including a plurality of resistors connected in series to one another and a plurality of signalling contacts short-circuiting, respectively, said resistors of said second group, a first rectifying cell connected in parallel to said first group, and a second rectifying cell connected in parallel to said second group, said rectifying cells being connected to each other in opposition, said first group being arranged so as to produce a first signalling potential and said second group being arranged so as to produce a second signalling potential after the first signalling potential produced by said first group; resistors connected, respectively, to said first wire and said second wire of said double line; a receiving device including means producing comparison potentials; means for comparing the signalling potentials produced by said signalling device with the comparison potentials produced by said producing means of said receiving device; a reversing relay forming part of said receiving device; means for energizing said reversing relay after the first signalling potential produced by said first group has been compared to the comparison potential; and contacts controlled by said reversing relay and arranged for reversion of the voltage applied to said groups of said signalling device, said resistors connected to said first wire and second wire of said double line equalizing the current conditions in said double line in all positions of said contacts controlled by said reversing relay, whereby first said first group of said signalling device produces the first signalling potential which is compared to the comparison potential by said comparing means, then said reversing relay is energized so as to render said second group of said signalling device operative in order to produce the second signalling potential, and finally said second signalling potential is compared to the comparison potential by said comparing means.

ROELOF MAARTEN MARIE OBERMAN.
ANTONIE SNIJDERS.

REFERENCES CITED

The following references are of record in the file of this patent:

UNITED STATES PATENTS

| Number | Name | Date |
|---|---|---|
| 1,982,290 | Gardner | Nov. 27, 1934 |
| 2,347,108 | Hubbard | Apr. 18, 1944 |
| 2,349,129 | Albert | May 16, 1944 |
| 2,364,771 | Bascom et al. | Dec. 12, 1944 |
| 2,400,148 | Hubbard | May 14, 1946 |
| 2,431,904 | Andrews | Dec. 2, 1947 |
| 2,440,249 | Deakin | Apr. 27, 1948 |
| 2,489,576 | Henry | Nov. 29, 1949 |
| 2,512,639 | Gohorel | June 27, 1950 |
| 2,564,766 | Oberman | Aug. 21, 1951 |

FOREIGN PATENTS

| Number | Country | Date |
|---|---|---|
| 546,304 | Great Britain | July 7, 1942 |
| 792,731 | France | Jan. 9, 1936 |